Figure 1:
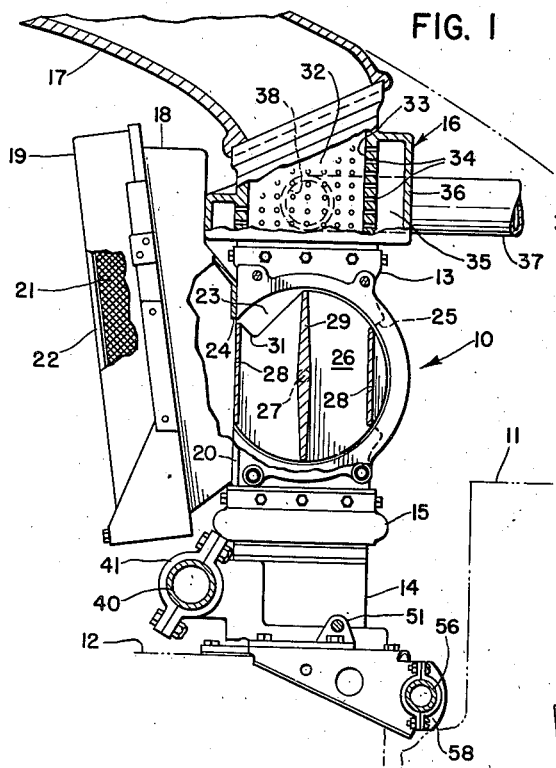

Oct. 21, 1947.   A. F. MATTHEWS ET AL   2,429,208
ENGINE COMBUSTION AIR CONTROL SYSTEM
Filed April 7, 1944   2 Sheets-Sheet 1

Inventors
ARTHUR F. MATTHEWS
ROBERT D. McCLURE JR.
EDMOND SIROKY

By
Attorney

Oct. 21, 1947.  A. F. MATTHEWS ET AL  2,429,208
ENGINE COMBUSTION AIR CONTROL SYSTEM
Filed April 7, 1944  2 Sheets-Sheet 2
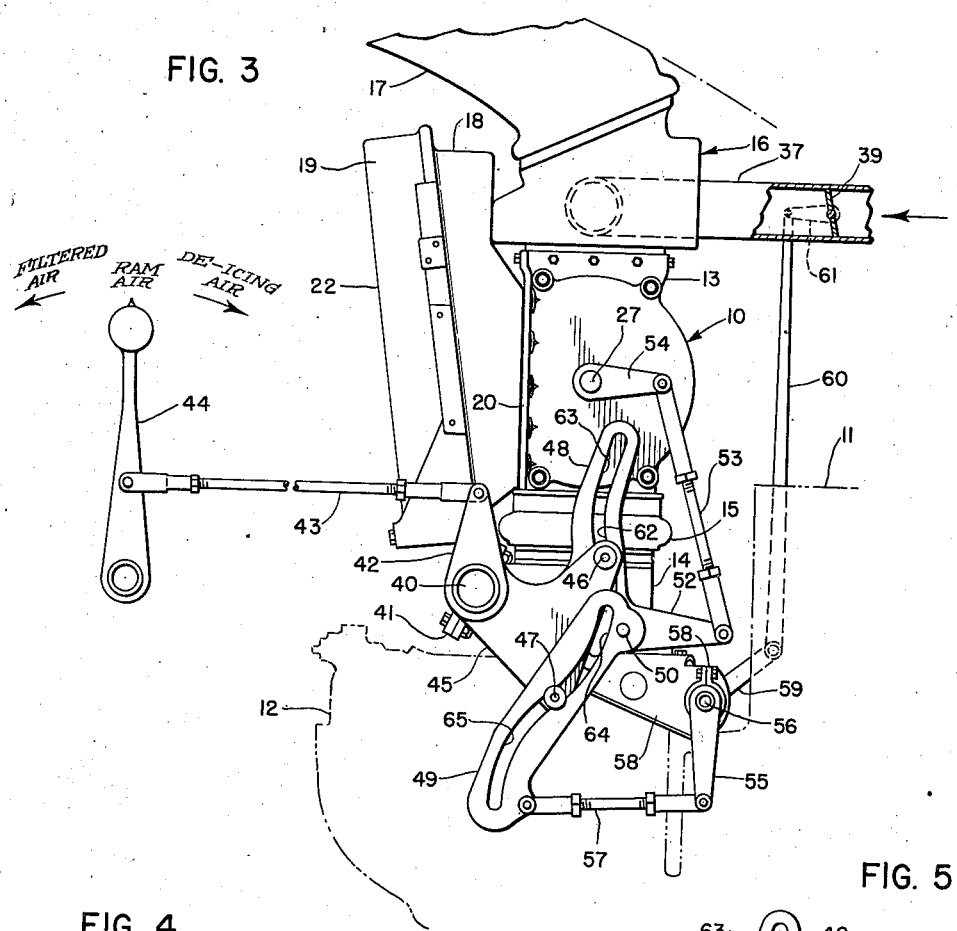
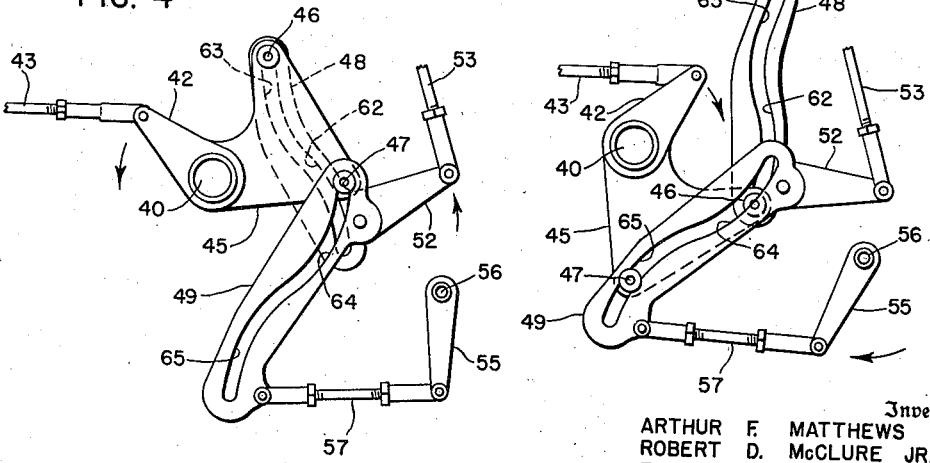
Inventors
ARTHUR F. MATTHEWS
ROBERT D. McCLURE JR.
EDMOND SIROKY
Attorney Patented Oct. 21, 1947

2,429,208

UNITED STATES PATENT OFFICE 2,429,208

ENGINE COMBUSTION AIR CONTROL SYSTEM

Arthur F. Matthews, Ferguson, and Robert D. McClure, Jr., and Edmond Siroky, University City, Mo., assignors to Curtiss-Wright Corporation, a corporation of Delaware Application April 7, 1944, Serial No. 530,070

14 Claims. (Cl. 123—122)

1

The present invention relates to internal combustion engines generally and is particularly directed to an improved combustion air induction control system adapted for engines utilized in aircraft or land vehicles and the like.

In the operation of an internal combustion engine driven vehicle and especially where the combustion air is drawn or forced into the carburetor mechanism by the forward motion of the vehicle it frequently develops that atmospheric conditions will adversely affect the smooth functioning or continued operation thereof. In referring to adverse atmospheric conditions it is meant that under certain characteristics of air flow, temperature and moisture content the rapid formation of ice may occur in the engine carburetor which can be serious enough to freeze up the carburetor and associated air control valve; and that under other conditions the air can contain dust, dirt and abrasive matter in quantities sufficient to cause rapid deterioration of moving parts of the engine. While these effects may not be particularly important or critical with the general class of engine driven land vehicles it is of great importance with the airborne class of vehicles such as the heavier-than-air craft.

The following discussion of this invention shall be directed to its application in aircraft; however it should be recognized that a broadened field of use to other than aircraft is contemplated herein. The aircraft application of the invention finds particular merit in that an aircraft can be utilized for operations in widely varying geographical locations with no special provisions being required to protect the power plant against differences in climatic conditions so encountered. Frequently, the carburetor air intake system on an airplane must be specially adapted to meet operating conditions expected of it in a specific locality. With the air control arrangement hereinafter to be described in detail it becomes possible to incorporate in a single unit the means necessary to permit safe and continuous operation of an aircraft engine or engines through varied climatic conditions and atmospheric variations. This means incorporates in one unit provisions for obtaining atmospheric air as a primary combustion air source together with a valving means controllable to select the atmospheric air for delivery to the engine directly or to divert such air into the engine compartment or other area prior to its passage through a filtering means and introduction to the engine carburetor or air-fuel mixing device. There is also made available to the system means for heating the combustion

2 air such as a supply of hot exhaust gas for admixture with the atmospheric air whereby it may be heated above the temperature level at which ice can form in the passages of the air induction apparatus or carburetor throttle valve.

Accordingly the present invention has as one of its principal objects the provision for an internal combustion engine of means for receiving atmospheric or ram air due to the forward motion of the engine driven vehicle and which means shall be effective to alter a characteristic of such air prior to delivery thereof to the engine carburetor or air-fuel mixing device.

A general object is to be found in the provision of an improved air induction control means for carrying out the above noted object and in means for providing a certain selectivity over the characteristic of air to be delivered from a number of sources whereby it will be possible to supply the engine with combustion air in its most desirable condition.

Another object is to arrange an engine air induction control means in a simple manner and to combine therein means which shall be effective to increase the versatility and usefulness of the engine, especially when utilized for aircraft propulsion.

A further object resides in the provision of an actuating mechanism for establishing the control over and proper correlation of the engine air induction control means and primary adjuncts, the same being effective to position the air induction means for carrying out certain desirable changes in the air supplied to the engine and to position the air induction means and primary adjuncts for a realization of certain other changes in the air supplied to the engine.

Figure 2:
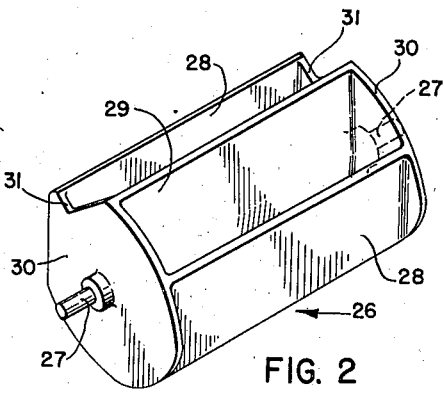
Figure 6:
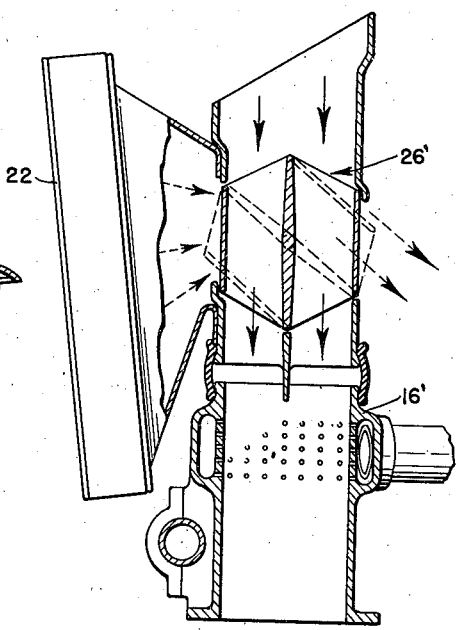
Figure 7:
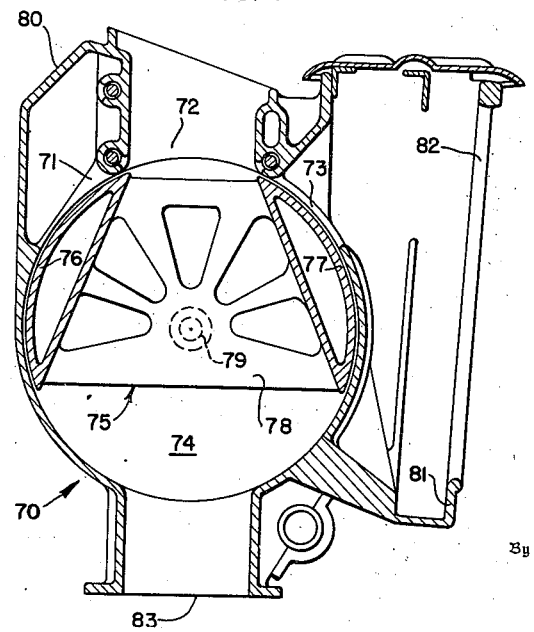

These and other objects and advantages will be pointed out in the course of the detailed description given in connection with the accompanying drawings, in which:

Fig. 1 is an end elevation of the preferred air induction valve unit and is shown partly in section with certain other portions broken away the better to illustrate important features thereof, Fig. 2 is a perspective view of the vane type valve member as employed in the preferred air induction control system, Fig. 3 is an end elevation of the valve assembly in which the novel actuating system is illustrated to advantage, Fig. 4 is a view of the actuating mechanism when moved from the neutral position of Fig. 3 in order to adjust the air induction valve to alter a characteristic of the engine air, Fig. 5 is a view similar to Fig. 4 but showing a reverse movement in the actuating mechanism which will result in a further alteration of the engine air characteristic, Fig. 6 is a modification of the air induction valve assembly of Fig. 1, though the principle of operation is not changed, and Fig. 7 is a further modification of the air induction unit in which the valve element shown is of rotary type and in which a plurality of combustion air supply ports are each controlled by the valve unit.

Referring now to Figs. 1, 2, and 3, the principal form of the present air induction control unit is seen at 10 while the engine and carburetor with which it is associated are indicated in outline at 11 and 12 respectively. More particularly, the air induction control unit consists of a valve housing 13 mounted on a down draft air inductor tube 14 for the carburetor or other fuel-air mixing device as by means of a resilient connector collar 15. Directly above the housing 13 there is positioned a diffuser 16 which may be of fabricated sheet construction or a cast body as shown. The principal source of combustion air is introduced first to the diffuser 16 by means of a pipe or conduit 17 which is connected to an air scoop or inlet port (not shown), the latter being positioned to receive ram air as a result of the forward motion of the airplane or other body or vehicle being propelled by motor 11. The air flowing or forcibly rammed into the tube 17 by the forward motion of the vehicle or airplane moves from the diffuser 16 to and through the valve housing 13 on its way to the carburetor induction pipe 14. The diffuser unit 16 will be referred to presently and in more detail in connection with the discussion of its function in the system.

In addition to the diffuser body 16, a housing 18 and removable frame and cover 19 is bolted or otherwise secured to a side wall 20 of the valve housing 13 as shown in Fig. 3 for the positioning of a filter 21, carried within the frame structure 19, over the entire cross-section of the air inlet 22. The filtered air is introduced to the valve chamber 23 through port 24 while the air supply for the filter unit is obtained from the side of valve housing 13 opposite the filtered air port 24, the same being ported at 25 so that ram air may be directed into the motor compartment or enclosure where it eventually will be drawn through the filter means 21 by way of air inlet 22.

The means for controlling the supply of atmospheric ram air or filtered enclosure air comprises a valve member 26 of parallel vane type (Fig. 2) which is fully enclosed by and operatively positioned in the housing 13 to rotate on a shaft 27, the latter being mounted in suitable bearings (not shown) formed in the cover plates or end walls of the housing 13. The valve 26 consists of side or lateral vanes 28 and an intermediate spaced vane 29 all integrally formed with end plates 30 such that a unitary valve element results. The side or lateral vanes 28 are substantially flat and of a size sufficient to close the ports 24 and 25, before noted, when positioned vertically as in Fig. 1; while the centrally disposed vane 29 is given a slight entering and exit fairing for reduction of resistance to air flow. The valve 26 is indicated in the neutral position in Fig. 1 such that ram air entering pipe 17 will pass directly to the carburetor air induction pipe 14. Should filtered air be desired, the valve 26 is intended to be rotated counter-clockwise until the central vane 29 lies diagonally across the chamber 23, in which position the entering ram air is diverted or forced by the upper face of vane 29 to pass through the port 25 and into the engine compartment. This air will then flow to the filter inlet 22 and again enter the valve chamber through port 24, whereby the under surface of the central vane 29 will act to direct the filtered air into the induction pipe 14. It will be noted that the filter-supporting housing 18 has a considerable outward flare at the port 24, and in order to realize the full port area when the valve 26 has been rotated, the end plates 30 of this valve are cut back or notched as at 31 (Fig. 2) so that air may enter the space between the vanes in a direction axially thereof. The same general arrangement of vaned-type valve rotor and its two-position function is better shown in connection with the modified version shown in Fig. 6 wherein the dotted lines and arrows show schematically the valve position and air flow path for obtaining filtered air.

Again referring to Figs. 1 and 3, the diffuser chamber 16 is formed to provide a central passage 32 defined by wall 33 having a multiplicity of perforations 34 communicating with an annular surrounding space 35, the latter space being defined by a jacket wall 36. A pipe 37 opens into the space 35 at port 38, and the other end of this pipe 37 connects with one or more of the engine-cylinder exhaust gas stacks (not shown). A controlling butterfly valve 39 is mounted in pipe 37 and may be interconnected with a second valve (not shown) positioned in the normal exhaust stack whereupon the two valves function simultaneously to close pipe 37 and open the exhaust pipe (not shown) or vice-versa. Thus, when valve 39 is open, the hot exhaust gas will flow into chamber 35 and pass through the apertures 34 to mingle with the column of ram air passing through the central passage 32 of the diffuser body 16. It is of course understood that any other suitable source of heat may be substituted for the heat source shown.

In order to realize the full benefits of the air induction system, controlling mechanism has been applied to the unit and its function is such that the operator of the vehicle or pilot of the airplane instantly may select the condition of combustion air which will result in the most desirable engine operation. One such mechanism is indicated in Fig. 3 and comprises a main jack shaft 40, carried in one or more bearings 41 at the side of air induction tube 14, the shaft being rotated or oscillated by an integral crank arm 42. An operating rod 43 is pivotally attached to the arm 42 and extends to a suitable control lever 44 positioned adjacent the location of the operator or pilot. A plate-like actuator means 45, either integral with or separate from member 42, is secured to the jack shaft 40, as by welding or the like, and moves in unison with the crank 42. Spaced roller elements 46 and 47 are mounted on the actuator plate as shown and are adapted to cooperate with slotted camming levers 48 and 49 respectively. The cam levers 48 and 49 are pivotally mounted at 50 on a common bracket element 51 (Fig. 1). Lever 48 is formed with an integral and angularly related arm 52 which connects with an adjustable rod 53, the latter in turn being connected with the valve operating lever or crank arm 54 secured to shaft 27. The remaining cam lever 49 connects with crank arm or lever 55 on jack shaft 56 by means of an adjustable rod 57. The shaft 56, operatively mounted in spaced bearing brackets 58, extends across the engine block to the opposite side where a second crank arm or lever 59 is secured. A rod 60 pivotally joined with lever 59 extends to the operating arm 61 of the butterfly valve 39 in the exhaust gas pipe 37 leading to the diffuser chamber 35.

With reference in particular to the cam lever 48 of Fig. 3, it will be noted that the arcuate cam slot formed therein has the lower, lost motion portion 62 of its cam slot struck off from the axis of jack shaft 40 as its center. The upper and effective portion 63 of the cam slot is given a reversed arcuate trend, the specific curvature of which may be varied according to the angular displacement desired in the lever arm 52. In similar manner, the cam lever 49 is formed with an upper, lost-motion arcuate cam slot 64, the center of which is also the axis of jack shaft 40, while the lower and effective portion 65 of the slot has been given an arcuate trend which also may vary in accordance with the amount of throw required of the lever 55 on jack shaft 56.

In operation, if a dust laden air condition or air containing abrasive matter should exist or be encountered, it will be then important to filter the air so that deleterious matter will not enter the engine cylinders. The filter unit 21 provides the means for removing such matter and the same is made effective when the valve 26 is rotated counter-clockwise an amount sufficient to place its central vane 29 diagonally across the valve passage 23. To accomplish this end, the lever 44 is moved in the direction to select "filtered air" and by so doing the crank 42 is rotated in a counter-clockwise direction. This has the effect of raising the roller elements 46 and 47 with actuator plate 45 producing the result that roller 46 engages in the effective cam portion 63 and moves cam lever 48 in a counter-clockwise direction but has no motion-producing effect on the slotted cam lever 49, Fig. 4, since the roller 47 is moving in cam portion 64 which is referred to as an over-riding or lost-motion cam. As lever 48 moves, due to the roller 46 moving from the lost-motion cam portion 62 into the effective but reverse-curved cam portion 63, the arm 52 raises the rod 53 and it, in turn, rotates crank arm 54 in the desired direction. Hence, the valve 26 is moved so that ram air spills into the engine compartment through port 25 and is subsequently passed through the filter on its way to the carburetor through port 24.

On the other hand, should a heated air supply be required in order to prevent icing of the carburetor and associated mechanism, the control lever 44 may be moved to the "de-icing air" position and as a consequence thereof the lever 42 is rotated in a clockwise direction the desired amount. Simultaneously the actuator plate 45 will move roller elements 46 and 47 downwardly in the cam slots 62 and 65 of levers 48 and 49 respectively. Since these rollers move about the axis of the jack shaft 40, cam lever 48 will be undisturbed due to the lost-motion slot portion 62 associated with roller element 46 but cam lever 49 will be drawn to the left as in Fig. 5 (clockwise rotation) because of roller engagement in the effective cam portion 65 thereof. Thus the valve 39 will be moved to open exhaust gas feed pipe 37 through the motion of rod 57, lever 55, jack shaft 56, lever 59 and rod 60. Hence, the exhaust gas will flow into chamber 35 of diffuser member 16 and pass into the column of ram air through perforations 34 in wall 33. Mingling of hot exhaust gas and ram air will prevent ice formation or aid in removing ice accumulations in the carburetor.

It will now be evident that the principal air induction control system, discussed in connection with Figs. 1, 2, and 3, provides a most simple yet efficient means for securing selective variations in the characteristics of the combustion air being supplied to the engine of a vehicle or airplane. However, an equally effective and serviceable air induction valve means is disclosed in Fig. 6 and in which disclosure the essential features and sequential operations of the preferred arrangement are retained. The important modification resides in the location of the diffuser means 16' below the valve member 26'. The means for controlling this unit has not been indicated, but it is to be understood that the same will be substantially identical with or equivalent to the cam-lever system of Figs. 3, 4, and 5.

A further modification is illustrated in Fig. 7, wherein the induction valve body 70 is formed to provide three circumferentially spaced inlet ports 71, 72, and 73 respectively admitting to the chamber 74 heated air, ram or fresh air and filtered air. The rotary type valve 75 accordingly is formed to provide a pair of sector-like port closure elements 76 and 77 connected by one or more web elements 78. The valve shaft 79 is formed on or mounted in these webs 78 as indicated. Suitable operating mechanism (not shown) will serve to rotate valve 75 from the ram air position shown to either side to admit either the heated air through port 71 or the filtered air through port 73. The heated air taken from any suitable source is conducted to valve inlet port 71 by way of the jacket structure 80 while the filtered air is inducted through the filter housing and supporting structure 81 as by way of the filter inlet opening 82. Regardless of the position of rotary valve 75 the combustion air is directed through inductor tube 83 for delivery to the engine or point of utilization.

While the preferred structural arrangement has been shown, together with certain modifications, it is to be understood that further modifications, rearrangements, alterations and substitutions may be effected or become obvious after a study of the foregoing without departing from the spirit and intended scope of the invention as defined by the claims hereinafter appended.

What we claim is:

1. In an enclosed internal combustion engine having a combustion air induction system, an engine air induction control means comprising a valve housing associated with the engine air inducting system, a conduit directing a supply of air into the valve housing from outside the enclosure, a conduit directing a supply of air into the valve housing from within the enclosure, means for filtering the enclosure air passing through the enclosure air supply conduit, means for heating the air supplied to the engine, an air selector valve element operatively positioned in the valve housing, and valve controlling means adapted to position said valve for the admission to the engine induction system of filtered enclosure air or outside air, said controlling means including means adapted to regulate said heating means.

2. In an enclosed internal combustion engine arrangement, combustion air induction and control means for the engine comprising a valve housing associated with the engine air induction system, a conduit directing air from outside the engine enclosure into said housing, a conduit directing enclosure air into said housing, heating means for the outside air supply, filter means for the enclosure air supply, an air selector valve member operatively positioned in the valve housing, and control means for said selector valve and air heating means whereby the engine may be supplied with outside air, filtered enclosure air or heated outside air as desired.

3. In an enclosed internal combustion engine arrangement, combustion air induction and control means for the engine comprising a valve housing associated with the engine air induction system, a conduit directing air from without the engine enclosure into said housing, a conduit directing enclosure air into said housing, said housing having a port opening into the engine enclosure, an air selector valve member operatively positioned in the housing, a filter unit positioned in the second mentioned conduit, and valve position controlling means adapted to position said valve for passage of air from without the enclosure through the housing while closing said port or to position said valve to direct air from without the enclosure through said port and into the engine enclosure for ultimate passage to the enclosure air directing conduit for induction to the engine.

4. In an enclosed internal combustion engine arrangement, combustion air induction and control means for the engine comprising a chambered housing having a pair of air inlet ports and a pair of air outlet ports, an air supply means to supply air from outside the engine enclosure for one of said inlet ports, an enclosure air supply means for the other of said inlet ports, an air inductor conduit between the engine and one of said outlet ports, a valve member rotatively mounted in said housing chamber and being positionable to permit the passage of outside air therethrough to said inductor conduit while closing the other of said outlet ports or to permit the passage therethrough of enclosure air while diverting the outside air supply through said other outlet port, and valve positioning mechanism adapted to move said valve member as aforesaid.

5. The combination in a combustion air control means for an internal combustion engine air supply system, of a chambered body having pairs of air inlet and air outlet ports, separate means for the supply of combustion air to the inlet ports from separate sources, an engine air inductor tube associated with one of said outlet ports, and an air selector valve element operatively mounted in the body chamber, said valve element comprising a member having a plurality of vane elements arranged to direct the air flow through said body chamber and to control the opening and closing of said outlet ports, one of said plurality of vane elements being effective to divert the air supplied from one of said separate sources through the other of said outlet ports while permitting air flow to the engine inductor tube from the other said separate source of air.

6. The combination in a combustion air control means for an internal combustion engine air supply system, of a chambered body having pairs of air inlet and outlet ports, separate means for the supply of combustion air to the inlet ports from separate sources, an engine air inductor tube associated with one of said outlet ports, and an air selector valve element operatively positioned in the body chamber, said selector valve element comprising a member having a primary air flow control vane element and a pair of spaced secondary vanes arranged in port controlling association one with said other outlet port and one with an air inlet port.

7. In an air supply system for an enclosed internal combustion engine, a combustion air control valve structure comprising a chambered body having pairs of air inlet and air outlet ports provided therein, means for supplying external air to one of said inlet ports, means for supplying enclosure air to the remaining inlet port, an engine air inductor tube connected to one of said outlet ports, and an air selector valve element operatively positioned in the body chamber, said selector valve element comprising a member having a first vane element adapted to permit external air flow to the engine inductor tube or to divert the same to the other of said outlet ports and other vane elemens associated with the enclosure air inlet port and said other outlet port, said other vane elements being adapted to open the associated ports when said first vane element is positioned to divert the external air from the engine inductor tube.

8. In a combustion air supply arrangement for an enclosed engine, an engine air induction control means therefor including a conduit supplying atmospheric air to said control means, a conduit for the supply of enclosure air to said control means, means for heating said atmospheric air, means for filtering said enclosure air, said control means having a port opening into the engine enclosure, a valve element operative to open and close said conduits and said port, and valve element position control means adapted selectively to position the valve element for admission to the engine of atmospheric air, while maintaining said filtered enclosure air conduit closed, or for admission of filtered enclosure air to the engine, while venting atmospheric air through said port, further said position control means including secondary means in control of said heating means to render the same effective for heating atmospheric air only when the filtered enclosure air conduit is closed.

9. In a combustion air supply arrangement for an enclosed engine as set forth in the preceding claim, and in which the heating means is further defined as comprising a jacketed body having a perforated wall structure constituting a portion of the atmospheric air supply conduit, said air heating means also having means for the supply of engine exhaust gas to the jacketed body.

10. In an air control system for an enclosed type internal combustion engine, the combination with an engine air selector valve member provided with separate supplies of air taken from a zone outside the enclosure for the engine and ambient air, and means for heating the air supplied to the engine, of a valve in control of the heating means, and valve position controlling mechanism adapted to actuate the selector valve to select outside or ambient air for supply to the engine and the heating control valve to supply or cut off heat for air supplied to the engine, said mechanism comprising individual position control means for each of said valves, the same being mounted for pivotal displacement in opposite senses about a common pivot, and means adapted to effect the displacement of the valve position control means one at a time.

11. In an air control system for an enclosed internal combustion engine, the combination with an engine air selector valve member provided with a supply of air from outside the engine enclosure a supply of air closely surrounding the engine, and means for heating the air supplied to the engine, of a valve in control of the heating means, and valve position controlling means adapted to move said air selector valve from a position admitting only outside air to the engine to a position admitting the air surrounding the engine while maintaining said heat control valve in closed position, and to move the heating valve from a closed to an open position to heat the outside air supply while maintaining the air selector valve in position admitting only outside air, said position controlling means comprising individual position control linkages for each of said valves and an actuator member operatively associated with each control linkage to effect valve position regulation as aforesaid.

12. In an enclosed internal combustion engine having an air inductive means, a combustion air induction control system for the engine including a valve housing associated with the engine air induction means, a conduit directing air from outside the engine enclosure into said housing, a conduit directing enclosure air into said housing, heating supplying means for the outside air supply including a control valve, means for filtering the enclosure air supply, an air selector valve member operatively positioned in the valve housing, and control means for said selector valve and air heating means control valve comprising a selector valve positioning means including a cam lever provided with effective and lost-motion cam portions, heat control valve positioning means including a cam lever provided with effective and lost-motion cam portions, and an actuator common to both said cam levers and arranged to cause valve lever positioning movement of either cam lever through positive engagement with its effective cam portion while over-riding the remaining cam lever in the lost-motion cam portion thereof.

13. In an enclosed internal combustion engine arrangement, conduit means for passing air to the engine, said conduit means having a first inlet for air from outside the engine enclosure and a second inlet for air from within the enclosure provided with an air filter, said conduit means having an air outlet for discharging air into said enclosure, and valve means associated with the conduit means for selectively directing air through the latter from the first inlet to the engine, or through the conduit means from the first inlet to said outlet and from the second inlet to the engine.

14. In an enclosed internal combustion engine arrangement, conduit means for passing air to the engine, said conduit means having a first inlet for air from outside the engine enclosure and a second inlet for air from within the enclosure provided with an air filter, said conduit means being provided with air heating means and having an air outlet for discharging air into said enclosure, and control means associated with the conduit means and the air heating means for either: first, directing air from the first inlet heated by said air heating means to the engine; second, directing unheated air from the first inlet to the engine; or third, directing air from the first inlet to the outlet and from the second inlet to the engine.

ARTHUR F. MATTHEWS.
ROBERT D. McCLURE, JR.
EDMOND SIROKY

REFERENCES CITED

The following references are of record in the file of this patent:

UNITED STATES PATENTS

| Number | Name | Date |
|---|---|---|
| 2,123,347 | Ware | July 12, 1938 |
| 2,208,689 | Sulzman | July 23, 1940 |
| 2,058,204 | Ball et al. | Oct. 20, 1936 |
| 778,332 | Redman | Dec. 27, 1904 |
| 810,877 | McKeown | Jan. 23, 1906 |
| 1,295,999 | Mesna | Mar. 4, 1919 |
| 2,229,931 | Parker | Jan. 28, 1941 |

FOREIGN PATENTS

| Number | Country | Date |
|---|---|---|
| 206,263 | Switzerland | Nov. 1, 1939 |
| 848,026 | France | July 17, 1939 |